Aug. 8, 1939.  D. CLARKE  2,168,976
AUTO CUSHION
Filed March 31, 1938  2 Sheets-Sheet 1

Dumont Clarke
INVENTOR.
BY CA Knowles.
ATTORNEYS.

Aug. 8, 1939  D. CLARKE  2,168,976
AUTO CUSHION
Filed March 31, 1938    2 Sheets-Sheet 2
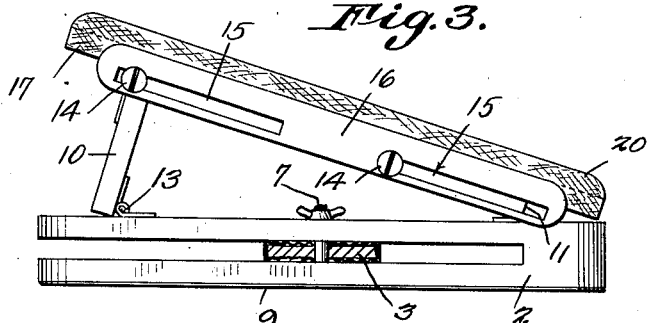
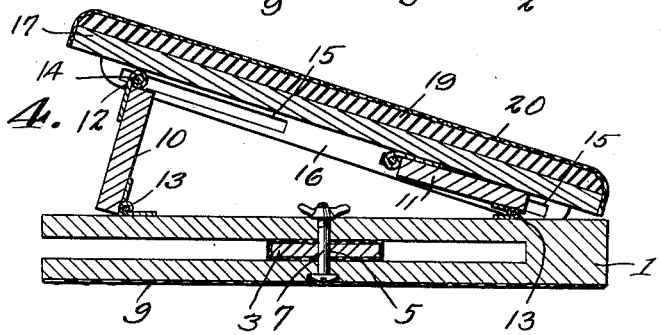
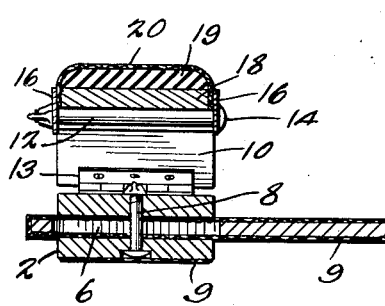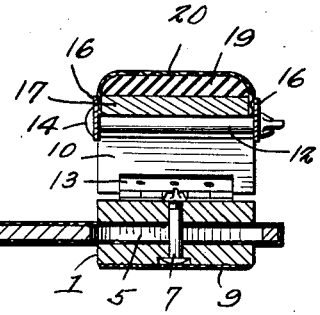
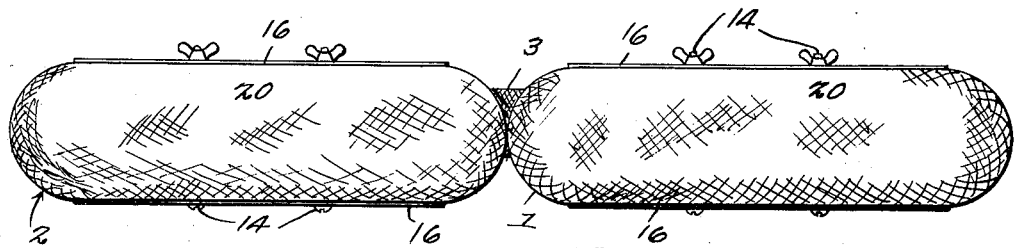
Dumont Clarke
INVENTOR.
BY
ATTORNEYS.

Patented Aug. 8, 1939

2,168,976

UNITED STATES PATENT OFFICE 2,168,976

AUTO CUSHION

Dumont Clarke, Manchester, Vt.

Application March 31, 1938, Serial No. 199,267

7 Claims. (Cl. 155—198)

This invention relates to improvements in automobile cushions, and more particularly to an automobile cushion which will be positioned across the knees of a person when in the driver's seat of an automobile, and includes means whereby the driver's arms will be supported upon the cushion in the proper position to reach the steering wheel.

An object of my invention is to provide an improved automobile cushion or arm rest for the driver of an automobile, which will be adapted to be supported upon the knees of the driver, and provided with adjustable arm supporting surfaces, whereby the arms may be supported in their normal driving position, thereby relieving the driver of fatigue when taking long drives.

Another object of my invention is to provide an improved automobile cushion or arm rest for persons driving automobiles, said apparatus being adapted to be supported upon the knees of the driver, and adjustable in a transverse direction, and also being angularly adjustable forwardly and rearwardly, whereby the arms may be supported in the most comfortable position for driving.

Another object of my invention is to provide an improved automobile cushion or arm support, which may be readily placed in position upon the knees of the driver when the same is to be used, and which may be folded into a minimum of space when the same is to be transported or stored, when not in use.

A still further object of my invention is to provide an improved automobile cushion and arm rest to support the arms of a driver, which will be highly efficient in use and relatively inexpensive to manufacture.

Other objects will appear as the description proceeds.

In the accompanying drawings which form a part of my application,

Figure 3 is an end elevation of my improved automobile cushion and arm rest;

Figure 4 is a transverse sectional view taken through my improved automobile cushion and arm rest;

Figure 5 is a longitudinal sectional view taken through my improved automobile cushion and arm rest; and Figure 6 is a plan view of the arm rest and cushion in folded position when the same is not being used.

Like characters of reference are used throughout the following specification and the accompanying drawings to designate corresponding parts.

Figure 1:
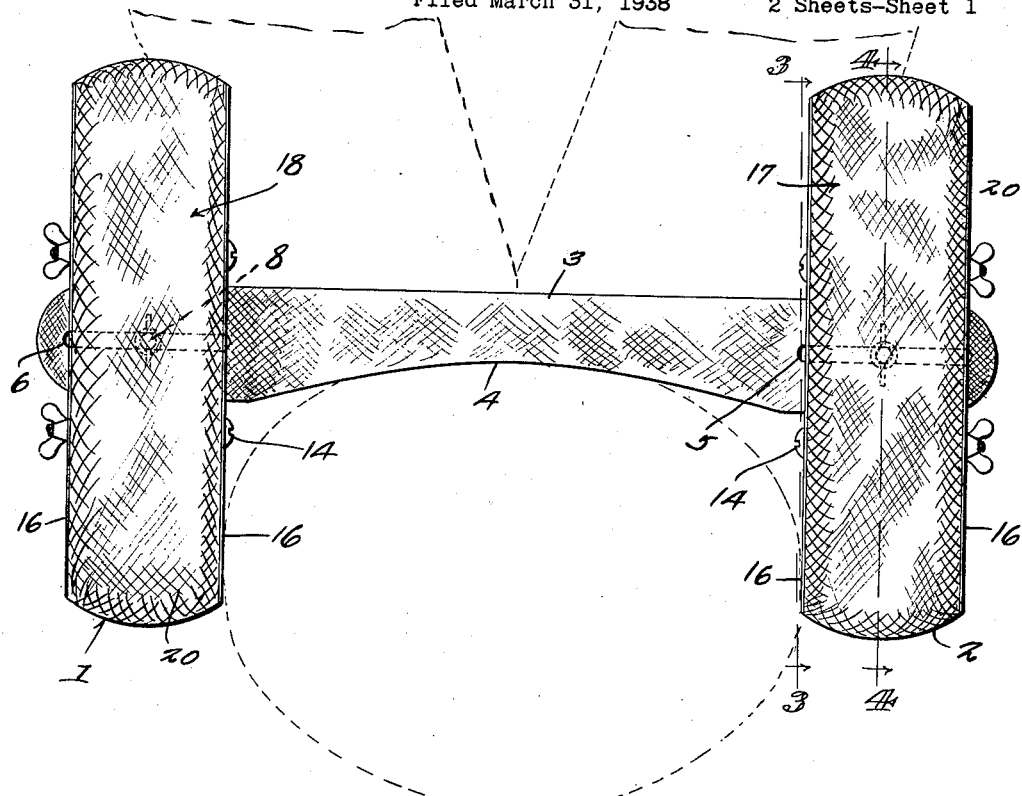
Figure 1 is a plan view of my improved automobile cushion and arm rest.
Figure 2:
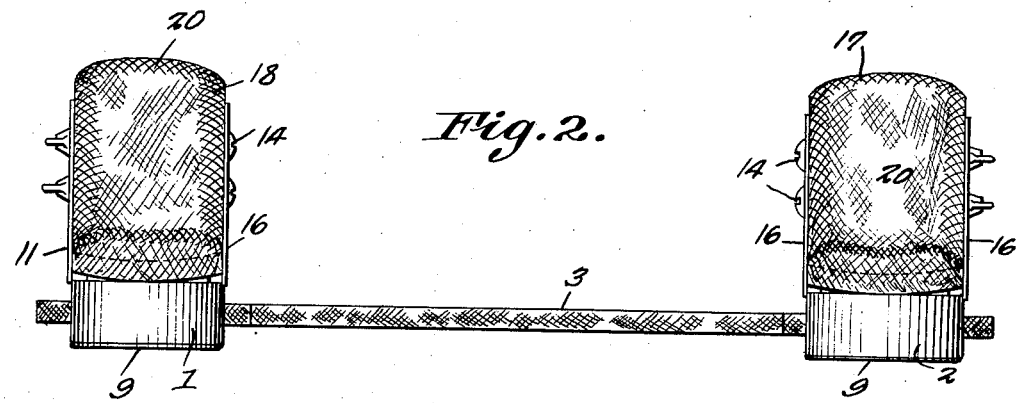
Figure 2 is a front elevation of my improved automobile cushion and arm rest.

In carrying out my invention, I provide an improved automobile cushion or arm support, which will comprise a pair of U-shape supporting rails 1 and 2, which are substantially rectangular in shape, and are adapted to be connected together by a cross supporting rail 3, the same being positioned within the slot in the rails 1 and 2, and the rear edge thereof being cut away as at 4 to more nearly fit a person's body when the device is in operation.

Adjusting slots 5 and 6 are formed in the opposite ends of the cross supporting rail 3, and the bolts 7 and 8 extend through the U-shape supporting rails and through the slot in the cross supporting rail 3 to hold the several parts in adjusted positions. The bolts 7 will be provided with wing nuts whereby the several parts may be held in place after an adjustment has been made.

A suitable protecting strip 9 of rubber or cloth, or whatever material may be desired, will be placed upon the lower surface of the U-shape supporting rails 1 and 2 and the cross supporting rail 3, so that when the device is in position supported upon a driver's legs, the driver's clothing will not be injured or shined from coming in contact with the device.

Mounted upon the upper surface of the U-shape supporting rails 1 and 2 are a pair of bracing rails 10 and 11, the same being provided with hinges 12 and 13 at their opposite sides, the hinges 13 being secured to the upper surface of the supporting rails 1 and 2, while the hinges 12 are connected with cross pins 14, which are adjustable in the elongated slots 15 formed in the reinforcing side rails 16 on the arm supporting rails 17 and 18. Suitable wing nuts will be disposed upon the ends of the cross pins 14, so that when the desired adjustment is had, the wing nuts may be tightened down to hold the arm supporting rails in their desired angular adjustment. The said arm supporting rails 17 and 18 will preferably be made with a cushioning strip of sponge rubber or the like as designated by the numeral 19, and a protective covering 20 of cloth or other suitable material may be placed upon the protective covering, in such a manner that the rubbing back and forth of the driver's arms on the arm supporting rail, will not injure or shine his clothing.

From the foregoing description, it will be apparent that when the improved automobile cushion or arm support is to be used, the same will be placed across the legs of the driver, as generally illustrated in Figure 1 of the drawings, and the brace rail 11 will be folded up against the arm supporting rail, while the brace rail 10 is elevated or extended, as illustrated in Figures 3 and 4 of the drawings, so that there will be an upwardly extending inclined support for the forearms of the driver, which will place the arms in the proper or normal position for operating the steering wheel. If desired, the arm supporting rails may be angled slightly inwardly from the rear to the forward portion, to more exactly suit the position of the driver's arms when driving.

It will be understood that the arm supporting rails may be adjusted in any desired angle within the limits of the hinged bracing rails, and it will be left entirely up to the driver to adjust the device until it is most comfortable for him when driving. Likewise, the distance between the two arm supporting rails may be adjusted to make the same more comfortable for persons of different size.

When it is desired to carry the improved automobile cushion and arm support, it will be turned out of the normal or driving position, to the position as illustrated in Figure 6 of the drawings, whereupon the same may be stored in a very small space until it is to be used again.

It will be understood that I do not intend to limit myself to the exact construction illustrated in the drawings, but will be limited by the scope of the claims hereafter set forth, as many minor changes in detail of construction may be resorted to without departure from the spirit of the invention.

Having thus described my invention what I claim as new and desire to secure by Letters Patent of the United States is:

1. A combined automobile cushion and arm support comprising a pair of supporting rails, a cross rail connecting said supporting rails, and arm supporting rails adjustably mounted on said first mentioned supporting rails.

2. A combined automobile cushion and arm support comprising a pair of U-shape supporting rails, a cross supporting rail connecting said U-shape supporting rails, a pair of arm supporting rails angularly supported upon said U-shape supporting rails and means whereby the angle of said arm supporting rails may be adjusted.

3. A combined automobile cushion and arm support comprising a pair of U-shape supporting rails, a cross supporting rail connecting said U-shape supporting rails, arm supporting rails hinged to said U-shape supporting rails for angular adjustment, means whereby the angle of said arm supporting rails may be adjusted, and means whereby the distance between said U-shape supporting rails may be varied.

4. A combined automobile cushion and arm support comprising a pair of U-shape supporting rails, a cross supporting rail adjustably connected to said U-shape supporting rails, bracing rails hinged to said U-shape supporting rails, arm supporting rails supported by said U-shape supporting rails and by said bracing rails, means whereby the angle of said arm supporting rails may be adjusted, and means whereby the distance between said U-shape supporting rails may be varied.

5. A combined automobile cushion and arm support comprising a pair of U-shape supporting rails, a cross supporting rail extending between said U-shape supporting rails between the arms thereof, means whereby the distance between said U-shape supporting rails may be varied, arm supporting rails adjustably secured on said U-shape supporting rails, a cushioning strip disposed on each of said arm supporting rails, and a protective covering disposed on each cushioning strip.

6. The combination as set forth in claim 5, and a protective covering disposed on the under surface of each of said U-shape supporting rails and said cross supporting rail.

7. A combined automobile cushion and arm support comprising a pair of U-shape supporting rails, a cross supporting rail connecting said U-shape supporting rails, arm supporting rails disposed upon said U-shape supporting rails, and means whereby the angular position of said arm supporting rails may be adjusted with respect to said U-shape supporting rails, and means whereby said arm supporting rails may be adjusted so that they will diverge or converge toward each other.

DUMONT CLARKE.